(12) United States Patent
Prorock

(10) Patent No.: US 6,754,704 B1
(45) Date of Patent: Jun. 22, 2004

(54) METHODS, SYSTEMS, AND COMPUTER PROGRAM PRODUCT FOR REMOTE MONITORING OF A DATA PROCESSING SYSTEM EVENTS

(75) Inventor: Thomas Joseph Prorock, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 748 days.

(21) Appl. No.: 09/598,804

(22) Filed: Jun. 21, 2000

(51) Int. Cl.$^7$ ............................................. G06F 13/00
(52) U.S. Cl. ..................................... 709/224; 719/328
(58) Field of Search ........................ 709/224; 717/120; 719/328, 329

(56) References Cited

U.S. PATENT DOCUMENTS

| | | | |
|---|---|---|---|
| 5,123,017 A | 6/1992 | Simpkins et al. | 371/15.1 |
| 5,307,354 A | 4/1994 | Cramer et al. | 371/11.2 |
| 5,379,448 A | 1/1995 | Ames et al. | 455/33.4 |
| 5,499,340 A | * 3/1996 | Barritz | 714/47 |
| 5,577,197 A | 11/1996 | Beck | |

(List continued on next page.)

FOREIGN PATENT DOCUMENTS

| | | |
|---|---|---|
| CA | 2099414 | 4/1994 |
| EP | 0 817 038 A2 | 1/1998 |
| GB | 2 330 430 A | 4/1999 |
| IE | 69327 | 9/1996 |
| IE | 78016 | 11/1997 |
| JP | 57125566 A | 8/1982 |
| JP | 61084776 A | 4/1986 |
| JP | 3017776 A | 1/1991 |
| JP | 4070032 A | 3/1992 |
| JP | 9006655 A | 1/1997 |
| JP | 11112680 A | 4/1999 |

OTHER PUBLICATIONS

U.S. patent application Ser. No. 09/060,280, Cromer et al., filed Apr. 14, 1998.
U.S. patent application Ser. No. 09/102,501, Yeomans, filed Jun. 22, 1998.
U.S. patent application Ser. No. 09/412,169, Felner et al., filed Oct. 5, 1999.

(List continued on next page.)

Primary Examiner—Kenneth R. Coulter
(74) Attorney, Agent, or Firm—J. Bruce Schelkopf; Myers Biegel Sibley&Sajove PA

(57) ABSTRACT

Embodiments of methods, system, and computer program products are provided that may facilitate monitoring of data processing system events. For example, data processing system event data may be collected and sent to an event handler program module. Once the event handler program module receives the data processing system event data, a remote program module, which resides in a different address space than the event handler program module, may be notified. The data processing system event data may then be sent from the event handler program module to the remote program module. Data processing system events may, therefore, be monitored from a remote location without the need to log in to the data processing system to manually extract the event data. Moreover, the data processing system event data may be sent from the event handler program module to the remote program module as events occur, thereby providing event notification in real-time. As a result, a remote program module need not expend processing resources polling the data processing system to determine if any events have occurred and remote personnel need not log in to the data processing system to check for events. A remote program module may monitor multiple data processing systems and may send event data to another remote program module. Thus, a scalable, hierarchical monitoring system may be constructed.

38 Claims, 8 Drawing Sheets

U.S. PATENT DOCUMENTS

| | | | | |
|---|---|---|---|---|
| 5,590,056 | A | * 12/1996 | Barritz | 702/186 |
| 5,621,892 | A | * 4/1997 | Cook | 709/224 |
| 5,768,119 | A | 6/1998 | Havekost et al. | |
| 5,768,523 | A | 6/1998 | Schmidt | |
| 5,768,524 | A | 6/1998 | Schmidt | |
| 5,781,737 | A | 7/1998 | Schmidt | |
| 5,805,785 | A | 9/1998 | Dias et al. | |
| 5,809,238 | A | 9/1998 | Greenblatt et al. | |
| 5,822,543 | A | 10/1998 | Dunn et al. | |
| 5,844,808 | A | 12/1998 | Konsmo et al. | |
| 5,855,550 | A | 1/1999 | Lai et al. | 600/300 |
| 5,864,535 | A | 1/1999 | Basilico | 370/231 |
| 5,864,653 | A | 1/1999 | Tavallaei et al. | 315/181 |
| 5,867,659 | A | 2/1999 | Otteson | |
| 5,870,724 | A | 2/1999 | Lawlor et al. | 705/42 |
| 5,872,784 | A | 2/1999 | Rostoker et al. | 370/395 |
| 5,878,326 | A | 3/1999 | Benz et al. | 455/31.2 |
| 5,889,863 | A | 3/1999 | Weber | 380/25 |
| 5,958,010 | A | * 9/1999 | Agarwal et al. | 709/224 |
| 6,144,993 | A | * 11/2000 | Fukunaga et al. | 709/208 |
| 6,343,295 | B1 | * 1/2002 | MacLeod et al. | 707/103 R |
| 6,671,724 | B1 | * 12/2003 | Pandya et al. | 709/226 |

OTHER PUBLICATIONS

Li, *Improved Process for Visual Development of Client Server Programs*, IBM Technical Bulletin, vol. 41, No. 1, Jan. 1998, pp. 281–284.

Rorock, *Enhanced Method for Monitoring Critical Resources in Token Ring Networks*, IBM Technical Bulletin, vol. 40, No. 1, Jan. 1997, pp. 111–122.

Dennison et al., *Method for Designing Recoverability in a Server*, IBM Technical Bulletin, vol. 36, No. 5, May 1993, pp. 41–44.

Fitzpatrick et al., *Guage Methodology for Event Completion*, IBM Technical Bulletin, Sep. 1992, pp. 32–34.

Aakre et al., *Remote Operation of Control Panel for a Data Processing System*, IBM Technical Bulletin, Jul. 1992, pp. 75–78.

Freund et al., *Remotely Controlled Diagnostic Interface*, IBM Technical Bulletin, Feb. 1987, p. 3862.

Benignus et al., *Public Data Network Communication From Text Processing Terminal Signal and Error Handling*, IBM Technical Bulletin, May 1983, pp. 6471–6475.

Borysowich et al., *Network Monitor*, IBM Technical Bulletin, Jul. 1982, pp. 543–547.

Calva et al., *Communications Statistical Network Analysis Program*, IBM Technical Bulletin, Feb. 1981, pp. 4282–4288.

Helfer, *Structure of Performance Monitor for Distributed Computer Systems*, IBM Technical Bulletin, Apr. 1978, pp. 5060–5065.

*IBM SurePOS ACE for 4690 OS*, http://www2.clearlake.ibm.com/store/product/html/ace.html, Jul. 13, 2000, 5 pp.

* cited by examiner

METHODS, SYSTEMS, AND COMPUTER PROGRAM PRODUCT FOR REMOTE MONITORING OF A DATA PROCESSING SYSTEM EVENTS

FIELD OF THE INVENTION

The present invention relates generally to the field of data processing or computing systems, and, more particularly, to remote monitoring of events in data processing or computing systems.

BACKGROUND OF THE INVENTION

Data processing systems may periodically log events that occur during operation. An event log may be maintained for a variety of reasons, such as, but not limited to, record keeping, problem analysis and debugging, inventory management, and billing. For example, a retailer may have multiple stores that are spread apart geographically. Each store may have a retail point of sale (POS) data processing system that is used to process purchases by customers and may also be used to manage store inventory, track sales trends, and provide accounting information. The retail POS data processing system at each store may maintain a log of event data and may further provide an interface to allow the event data to be viewed and/or processed locally. The retailer, however, may have a hierarchy of managing offices that are responsible for various groupings of stores. These managing offices, which are typically remotely located, may find reviewing the event data at the various stores for which they are responsible to be inconvenient. For example, a managing office may establish communication with a store using a dial-up connection and then use commands to query the store's database for event data or, alternatively, may download the store's event data for subsequent processing. Unfortunately, a manual approach as described in the foregoing may be labor intensive and may also be error prone.

SUMMARY OF THE INVENTION

Embodiments of the present invention may include methods, systems, and computer program products that may facilitate monitoring of data processing system events. For example, data processing system event data may be collected and sent to an event handler program module. Once the event handler program module receives the data processing system event data, a remote program module, which resides in a different address space than the event handler program module, may be notified. The data processing system event data may then be sent from the event handler program module to the remote program module. Data processing system events may, therefore, be monitored from a remote location without the need to log in to the data processing system to manually extract the event data. Moreover, the data processing system event data may be sent from the event handler program module to the remote program module as events occur, thereby providing event notification in real-time. As a result, a remote program module need not expend processing resources polling the data processing system to determine if any events have occurred and remote personnel need not log in to the data processing system to check for events.

In particular embodiments of the present invention, the data processing system event data may be sent to the event handler program module over a socket interface. This may allow the present invention to be practiced in data processing systems that use a communication protocol that supports the socket interface, such as the Transmission Control Protocol (TCP)/Internet Protocol (IP).

In further embodiments of the present invention, communication may be established between the event handler program module and the remote program module via a distributed object Application Programming Interface (API). Moreover, the distributed object API may be used to send the data processing system event data from the event handler program module to the remote program module. In particular embodiments of the present invention, the distributed object API may be the JAVA™ Remote Method Invocation (RMI) API, the Common Object Request Broker Architecture (CORBA) API, or the Distributed Component Object Model (DCOM) API.

In still further embodiments of the present invention, once the remote program module receives the data processing system event data, a second remote program module, which resides in a different address space, may be notified and the data processing system event data may be sent to the second remote program module. In this manner, a hierarchical monitoring system may be constructed in which one remote program module may send the data processing system event data to another remote program module. In particular embodiments of the present invention, remote program modules may communicate with one another via a distributed object API. Furthermore, the distributed object API may be used to send the data processing system event data from one remote program module to another remote program module. The distributed object API may be the JAVA RMI API, the CORBA API, or the DCOM API.

In other embodiments of the present invention, the data processing system event data may be classified into multiple categories. These categories may include, for example, whether an event is an error, a warning, or an informational event. In particular embodiments of the present invention, one remote program module may send to another remote program module only the data processing system event data that are classified in categories that satisfy a predetermined criterion.

In still other embodiments of the present invention, after the data processing system event data is sent to a remote program module, the data may be optionally filtered using criterion, such as date, severity, event number, etc., and then displayed on an output device using a graphical user interface (GUI). The GUI may be, for example, a Web browser or other suitable graphical interface that facilitates display of the data processing system event data.

In yet other embodiments of the present invention, the data processing system may be a point of sale (POS) system as is used, for example, in many retail stores for processing customer purchases.

Thus, the present invention may be used to facilitate remote monitoring of data processing system events. For example, in a retail application, a managing office may remotely monitor event data from one or more stores over which it has supervisory authority. Advantageously, the present invention is scalable, which may allow managing offices in the business hierarchy to remotely monitor event data received at offices and/or stores for which they have management responsibility. The present invention may use standardized protocols for communication, such as sockets and/or distributed object APIs, to allow for easy integration with data processing systems that already support these protocols.

Although the present invention has been described above primarily with respect to method aspects of the invention, it will be understood that the present invention may be embodied as methods, systems, and/or computer program products.

BRIEF DESCRIPTION OF THE DRAWINGS

Other features of the present invention will be more readily understood from the following detailed description of specific embodiments thereof when read in conjunction with the accompanying drawings, in which:

FIGS. 10–11 are flow charts that illustrate exemplary operations of methods, systems, and computer program products for event monitoring in accordance with embodiments of the present invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numbers signify like elements throughout the description of the figures.

For purposes of illustration and in no way limited thereto, the present invention is described herein in the context of monitoring events in a retail point of sale (POS) data processing system. It will be understood that the concepts and principles of the present invention may be applied to monitoring data processing system events in general.

The present invention may be embodied as methods, systems, and/or computer program products. Accordingly, the present invention may be embodied in hardware and/or in software (including firmware, resident software, microcode, etc.). Furthermore, the present invention may take the form of a computer program product on a computer-usable or computer-readable storage medium having computer-usable or computer readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer usable or computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

Figure 1:
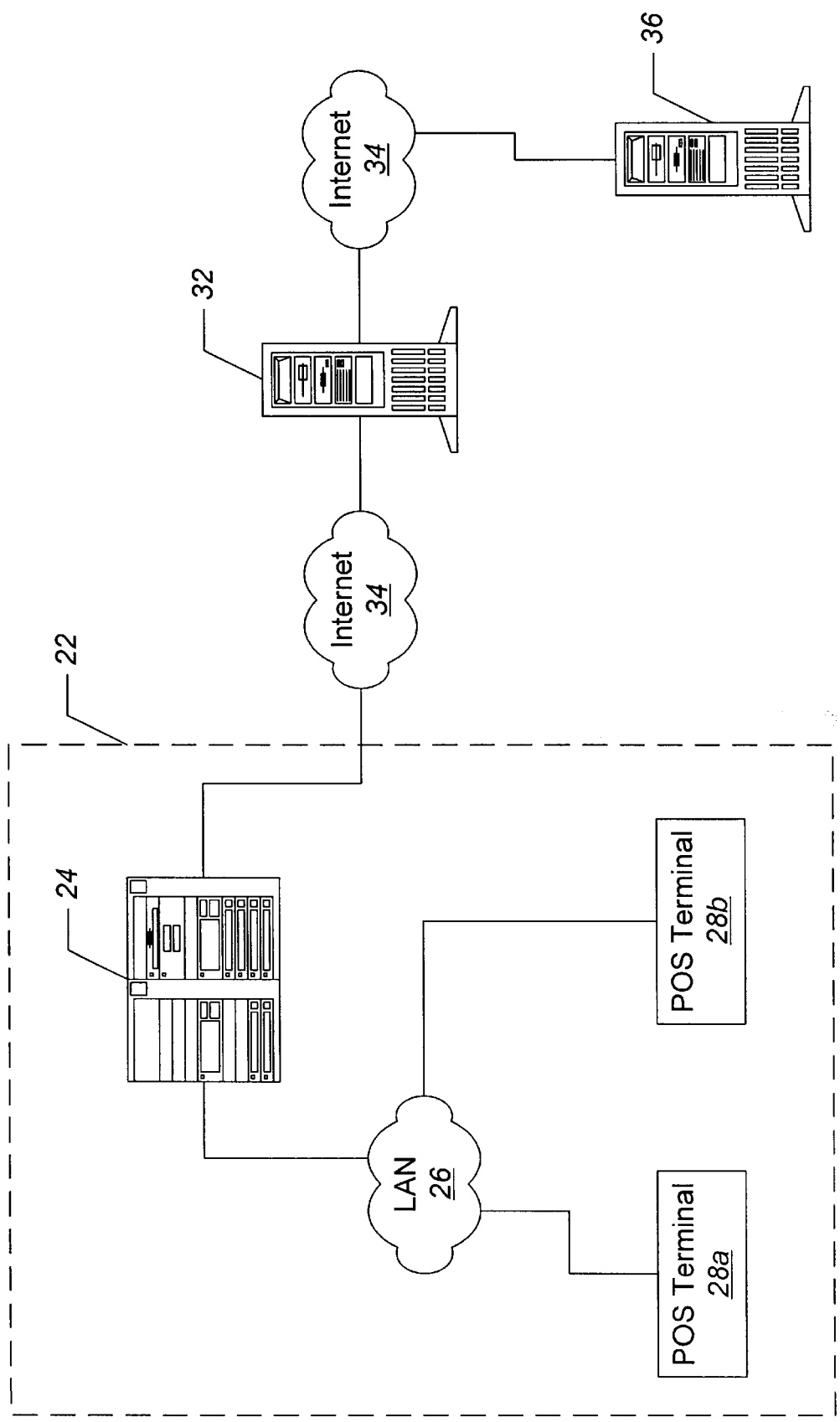
FIG. 1 is a block diagram of a data processing system network architecture that illustrates methods, systems, and computer program products for event monitoring in accordance with embodiments of the present invention.

Referring now to FIG. 1, an exemplary data processing system network architecture in accordance with the present invention includes a retail POS data processing system 22 that includes a data processing system/computer system 24, a local area network (LAN) 26, and POS terminals 28a and 28b. The POS terminals 28a,b and the data processing system 24 may operate in a client/server relationship if the POS terminals are configured with local processing power and intelligence or, alternatively, the POS terminals 28a,b may be implemented as "dumb" terminals. The POS terminals 28a,b may be connected to the data processing system 24 through a LAN 26, such as an Ethernet network. Alternatively, the POS terminals 28a,b may be directly connected to communication ports on the data processing system 24. The data processing system 24 may be configured with computational, storage, and control program resources to process customer transactions through the POS terminals 28a,b and, optionally, to provide such services as accounting, inventory management, and sales management. Thus, the data processing system 24 may be implemented as a single processor system, a multi-processor system, or even a network of stand-alone computer systems, which may include communication server(s), file server(s), mass storage systems, etc. An exemplary retail POS data processing system 22 that may be used in embodiments of the present invention is the 4690 POS System running IBM SurePOS™ ACE software, which is available from International Business Machines Corporation, Armonk, N.Y.

The retail POS data processing system 22 may communicate with a remote data processing system 32 over the Internet 34. In addition, the remote data processing system 32 may be configured to communicate with another remote data processing system 36 over the Internet 34. It will be understood that a private network or a combination of public (e.g., the Internet) and private networks may also be used to interconnect the retail POS data processing system 22 to the remote data processing system 32 and the remote data processing system 32 to the remote data processing system 36. The remote data processing systems 32 and 36 may represent computer systems located at managing offices that have supervisory authority over the store where the retail POS data processing system 22 is located.

Although FIG. 1 illustrates an exemplary data processing system network architecture that may facilitate remote monitoring of data processing system events, it will be understood that the present invention is not limited to such a configuration, but is intended to encompass any configuration capable of carrying out the operations described herein.

Figure 2:
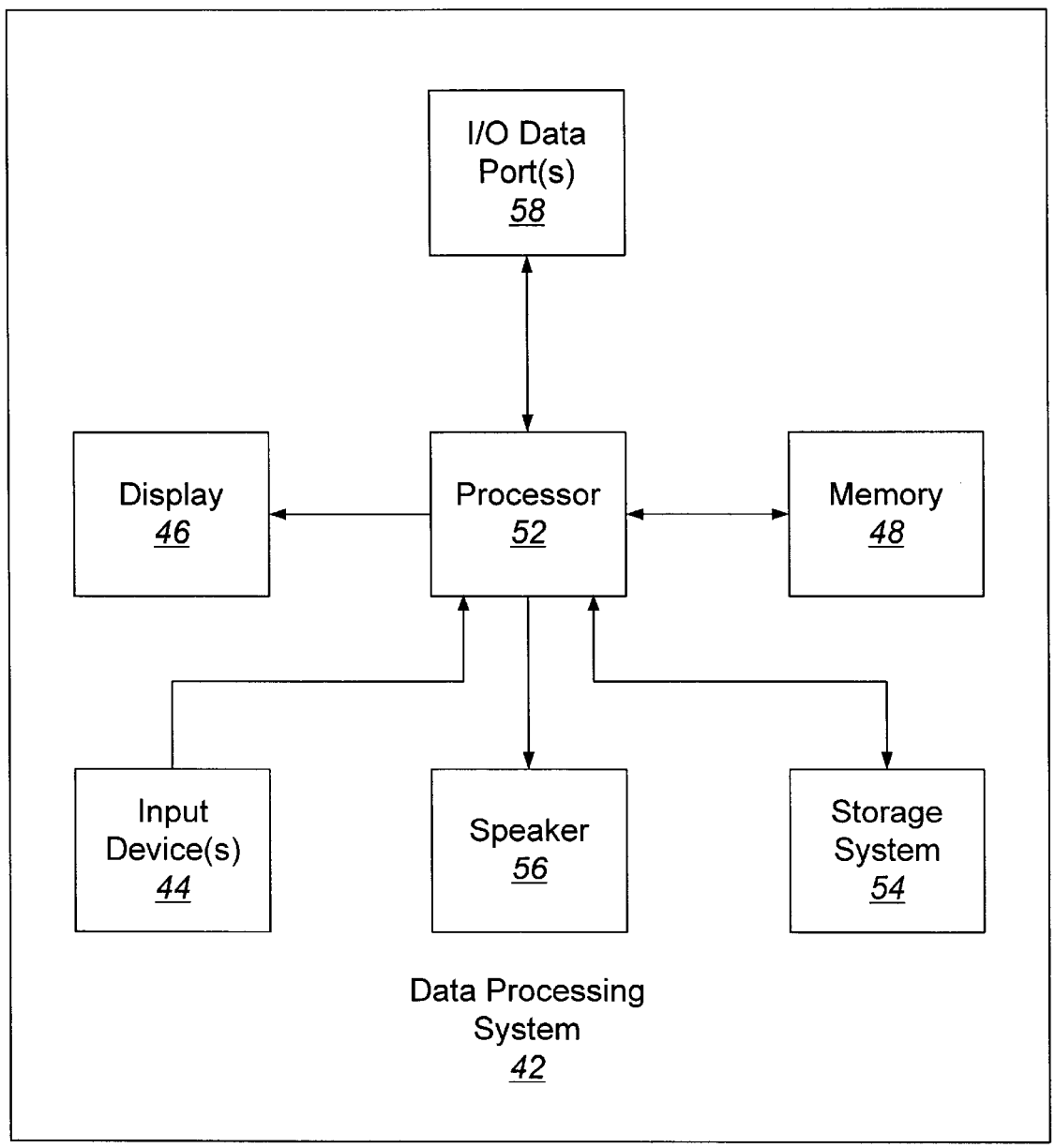
FIG. 2 is a block diagram that illustrates data processing systems in accordance with embodiments of the present invention.

With reference to FIG. 2, the data processing system 24 and the remote data processing systems 32 and 36 may be embodied as a data processing system 42 that includes input device(s) 44, such as a keyboard or keypad, a display 46, and a memory 48 that communicate with a processor 52. The data processing system 42 may further include a storage system 54, a speaker 56, and an I/O data port(s) 58 that also communicate with the processor 52. The storage system 54 may include removable and/or fixed media, such as floppy disks, ZIP drives, hard disks, or the like as well as virtual storage such as a RAMDISK. The I/O data port(s) 58 may be used to transfer information between the data processing system 42 and another computer/data processing system or a network (e.g., the Internet). These components may be conventional components such as those used in many conventional computing devices, which may be configured to operate as described herein.

Figure 3:
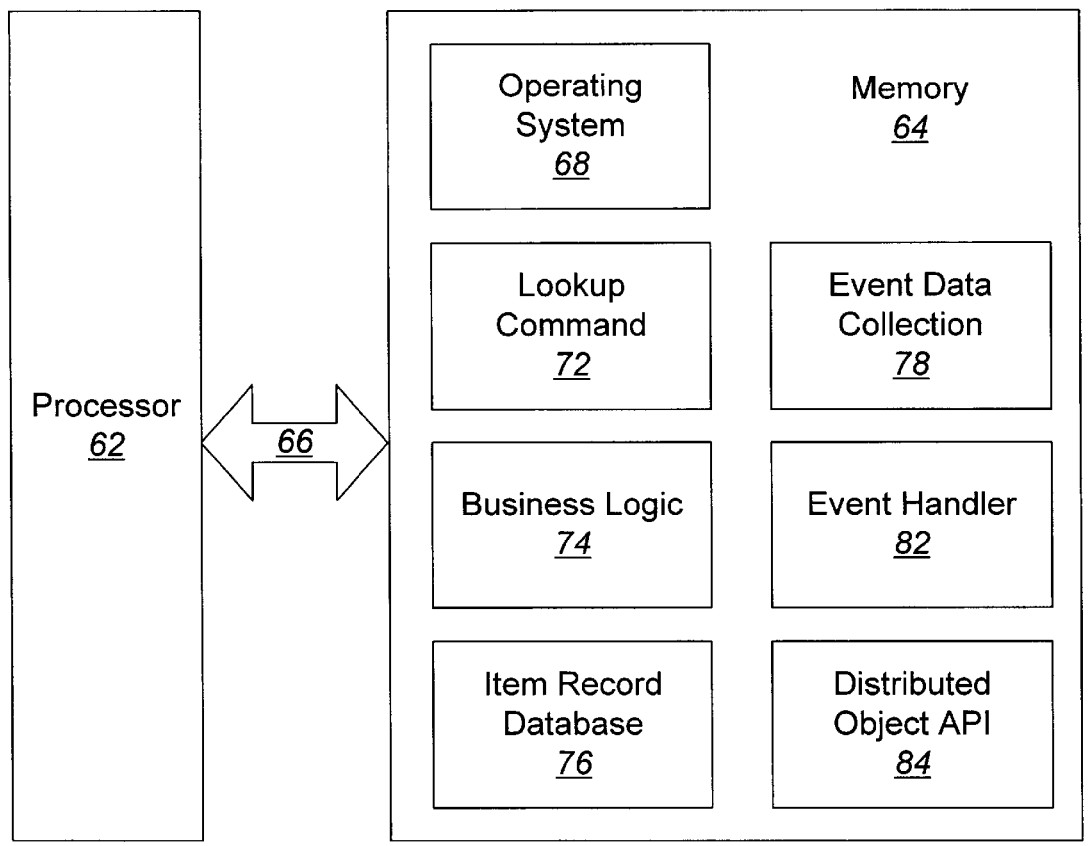
FIG. 3 is a block diagram that illustrates a processor and a memory that is configured with event monitoring program code for use in local data processing systems in accordance with embodiments of the present invention.

FIG. 3 illustrates a processor 62 and a memory 64 that may be used in embodiments of the retail POS data processing system 22 in accordance with the present invention. The processor 62 communicates with the memory 64 via an address/data bus 66. The processor 62 may be, for example, a commercially available or customer microprocessor. The memory 64 is representative of the overall hierarchy of memory devices containing the software and data used to implement data processing system event monitoring in accordance with the present invention. The memory may include, but is not limited to, the following types of devices: cache, ROM, PROM, EPROM, EEPROM, flash, SRAM, and DRAM.

As shown in FIG. 3, the memory 64 may hold seven major categories of software and data: an operating system 68, a lookup command program module 72, a business logic program module 74, an item record database module 76, an event data collection program module 78, an event handler program module 82, and a distributed object Application Programming Interface (API) module 84. The operating system 68 controls the operation of the computer or data processing system. In particular, the operating system 68 may manage the data processing system's resources and may coordinate execution of programs by the processor 62.

The lookup command program module 72, business logic program module 74, and the item record database 76 represent, at a high level, the program code that may be used to process customer transactions in the retail POS data processing system 22. These three program modules may be described by way of example. When a customer purchases an item, a clerk may scan the item or manually enter a code for the item at a POS terminal 28a,b. The lookup command program module 72 then builds a command to lookup the characteristics of the item in the item record database 76. The item characteristics may include such information as price, description (i.e., name of the item), whether the item needs to be weighed, whether the item may be purchased with food stamps, whether the item has a special pricing method, etc. The business logic program module 74 uses the "command" provided by the lookup command program module 72 to obtain the item characteristics from the item record database 76. Once the item characteristics have been obtained, the business logic program module 74 may perform operations related to selling the item to the customer, such as adjusting the price to account for a sale or discount, logging the transaction into a file in the memory 64, etc.

The event data collection program module 78 may be configured to receive all events that are logged in the retail POS data processing system's 22 event log in the memory 64. In general, an event may be anything that can occur in the operation of the retail POS data processing system 22 that can affect the service time and/or the data integrity of the retail POS data processing system 22. Retail POS data processing system 22 events may include, but are not limited to, the following hardware events: disk write error, disk read error, error opening file, disk full condition, master file server down, master file server back online, backup file server down, backup file server back online, error copying file to backup system, and out of memory. Furthermore, retail POS data processing system 22 events may include, but are not limited to, the following application or software events: a cash pickup of $XX.XX made at a POS terminal, a cash pickup needed at a POS terminal, a till exchange performed at a POS terminal, terminal offline condition at a POS terminal, a file record is locked for an extended period of time, error writing to the sales transaction log, error writing to the system journal, cash drawer open for an extended period of time, and excessive time delay between items scanned.

The event handler program module 82 may be configured to receive the retail POS data processing system 22 event data sent by the event data collection program module 78. Embodiments of the present invention may configure the event handler program module 82 and the event data collection program module 78 to communicate using a socket interface. A brief overview of the socket interface is described hereafter.

Broadly stated, a socket is one end-point of a two-way communication link between two programs running on a network. Socket communication is typically based on a client-server model in which a server application listens to a port to determine if a client application has issued a connection request. Upon receiving a connection request from a client application, the server application and the client application establish a dedicated connection over which they can communicate. As part of the connection process, the client application is assigned a local port number. Typically, the server application will also be assigned a new local port number so that it may continue to listen for connection requests on the original port number. The client application and server application also agree on a communication protocol to be used for their communication session. Thus, a socket address may be viewed as comprising three components: a protocol, a local port address, and a local process (i.e., the process corresponding to the client or server application). A socket connection may be specified using five components: a protocol, a local port address, a local process, a foreign port address, and a foreign process. In view of the foregoing, a client application may send information to the server application over the socket interface by writing to a socket using the server application's port address and process identification. Similarly, the client application may receive information from the server application over the socket interface by reading from the client application's own port address. The server application may communicate with the client application over the socket interface in like manner.

In light of the foregoing discussion, the event data collection program module 78 may operate as a client application and the event handler program module 82 may operate as a server application in sending the retail POS data processing system 22 event data over a socket interface from the event data collection program module 78 to the event handler program module 82. For development convenience, commercial software may be available for object-oriented programming languages, such as C++ or JAVA, that provides classes that may be used to facilitate implementation of the client side and server side of a socket connection.

The distributed object API 84 may be configured to allow the software modules in the memory 64 to be implemented as part of an object-oriented system that has objects distributed across a heterogeneous network. For example, the objects may be distributed across different data processing systems in a network and yet appear to each other as if they were local. In a distributed object-oriented computer system, client objects may be given object handles to reference remote server objects. A remote object is an object whose class is implemented in a process that is different from the process in which the handle resides. Moreover, a remote object may be implemented on a data processing system that is remote from the data processing system on which the object handle resides. An object handle identifies a remote, server object and may allow a client object to invoke member functions of the remote object. Three exemplary distributed object models are the Distributed Component Object Model (DCOM), the Common Object Request Broker Architecture (CORBA) model, and the JAVA Remote Method Invocation (RMI) model. These three models are briefly discussed hereafter.

The DCOM model uses a protocol called Object Remote Procedure Call (ORPC) to support remote objects. A DCOM server object can support multiple interfaces with each interface representing a different behavior of the object. In general, an interface is a set of functionally related methods. A DCOM client object may acquire a pointer to one of a DCOM server object's interfaces and may invoke methods through that pointer as if the server object resided in the DCOM client object's address space.

The CORBA model is based on an Object Request Broker (ORB) that acts as an object bus over which objects may transparently interact with one another irrespective of whether they are located locally or remotely. A CORBA server object supports an interface that comprises a set of methods. A particular instance of a CORBA server object is identified by an object reference. The object reference may be used by a CORBA client object to make method calls to the CORBA server object as if the CORBA client object and the CORBA server object shared the same address space.

The JAVA RMI model is specific to the JAVA programming language and relies on a protocol called JAVA Remote Method Protocol (JRMP) that uses sockets as an underlying communication mechanism. A JAVA RMI server object supports an interface that can be used by a JAVA RMI client object running on a different JAVA Virtual Machine (JVM) (i.e., different address space) than the JAVA RMI server object to access JAVA RMI server object methods. In particular, a naming mechanism called RMIRegistry is implemented that contains information about the JAVA RMI server objects and runs on the server JVM. A JAVA RMI client may acquire a reference to a JAVA RMI server object by doing a lookup in the RMIRegistry. The JAVA RMI server object reference may then be used by the JAVA RMI client object to invoke JAVA RMI server object methods as if the JAVA RMI client and server objects resided on the same JVM. Note that a JVM is defined as an imaginary machine that is implemented by emulating a processor through the use of software on a real machine. Accordingly, machines running under diverse operating systems and having a JVM may execute the same JAVA program.

Figure 4:
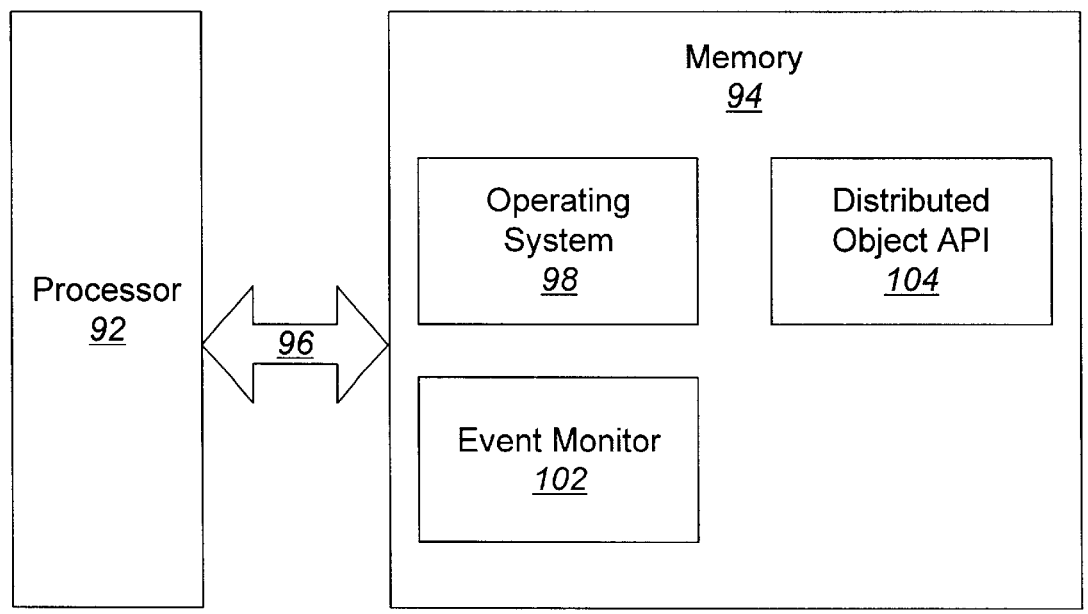
FIG. 4 is a block diagram that illustrates a processor and a memory that is configured with event monitoring program code for use in remote data processing systems in accordance with embodiments of the present invention.

FIG. 4 illustrates a processor 92 and a memory 94 that may be used in embodiments of remote data processing systems 32 and 36 in accordance with the present invention. The processor 92 communicates with the memory 94 via an address/data bus 96. The processor 92 may be, for example, a commercially available or custom microprocessor. The memory 94 is representative of the overall hierarchy of memory devices containing the software and data used to implement data processing system event monitoring in accordance with the present invention. The memory may include, but is not limited to, the following types of devices: cache, ROM, PROM, EPROM, EEPROM, flash, SRAM, and DRAM.

As shown in FIG. 4, the memory 94 may hold three major categories of software and data: an operating system 98, an event monitor program module 102, and a distributed object API 104. The operating system 98 controls the operation of the computer or data processing system. In particular, the operating system 98 may manage the data processing system's resources and may coordinate execution of programs by the processor 92.

The event monitor program module 102 may be configured receive retail POS data processing system 22 event data from the event handler program module 82. Moreover, the event monitor program module 102 may also include software for filtering the retail POS data processing system 22 event data and a graphical user interface (GUI) for displaying the retail POS data processing system 22 event data on a display device.

To facilitate notification of the event monitor program module 102 when the event handler program module 82 receives the retail POS data processing system 22 event data, the event monitor program module 102 and the event handler program module 82 may be configured to use the "Observer" interface and the "Observable" class, which are provided in the JAVA programming language class library. In general, an "Observer" object is any object that wishes to be notified when the state of another object changes. An "Observable" object is any object whose state may be of interest and in whom another object may register an interest. A new class of Observable objects may be created by extending the class Observable. The derived class may provide one or more methods for adjusting and maintaining the internal state of the of the Observable object. For example, the event handler program module 82 may be implemented as an Observable class and methods may be defined to track whether event data has been received from the event data collection program module 78.

A new class of objects that observe the state changes of another object may be created by implementing the Observer interface. In particular, an object implementing the Observer interface may implement an "update" method, which may be called whenever the Observable object changes state and announces this change to the Observer(s) by calling a "notifyObservers" method. As applied to the present invention, the event monitor program module 102 may implement the Observer interface and become an observer of the event handler program module 82. Thus, when the event handler program module 82 changes state by receiving new retail POS data processing system 22 event data from the event data collection program module 78, the event monitor program module 102 may be automatically notified.

In addition to implementing the Observer interface, the event monitor program module 102 may also extend the Observable class. For example, instead of observing the local, retail POS data processing system 22 for events, a remote data processing system may choose to observe another remote data processing system. In this manner, a hierarchy of Observer and Observable data processing systems may be created. For example, a district office may observe one or more stores, a regional office may observe one or more district offices, and a headquarters office may observe one or more regional offices.

Finally, the distributed object API 104 may be configured as described hereinabove with respect to the distributed object API 84 of FIG. 3. In particular, the distributed object APIs 84 and 104 may allow the event handler program module 82 to notify the event monitor program module 102 that event data has been received from the event data collection program module 78 using remote method calls even though the event handler 82 and the event monitor 102 reside in different address spaces. Likewise, the distributed object APIs 84 and 104 may allow the event handler 82 and event monitor 102 to send the retail POS data processing system 22 event data from the event handler 82 to the event monitor 102 using remote method calls as if the event handler 82 and the event monitor 102 resided in the same address space.

Although FIGS. 3 and 4 illustrate exemplary software architectures that may facilitate data processing system event monitoring, it will be understood that the present invention is not limited to such a configuration. For example, the event data collection program module 78 and the event handler program module 82 may be configured to execute on the same target processor in the same address space or, alternatively, may execute in different address spaces on the same target processor or on different processors. Accordingly, the present invention is intended to encompass any configuration capable of carrying out the operations described herein. Furthermore, the program modules of FIGS. 3 and 4 are described herein as objects in one or more object-oriented applications. It should be understood, however, that the program modules of FIGS. 3 and 4 may be implemented as individual applications. The phrase "program module" should therefore be understood to encompass both an object in an object-oriented program and a procedural application program.

Computer program code for carrying out operations of the present invention may be written in an object-oriented programming language, such as JAVA, Smalltalk, or C++. Computer program code for carrying out operations of the present invention may also, however, be written in conventional procedural programming languages, such as the C programming language or compiled Basic (CBASIC). Furthermore, some modules or routines may be written in assembly language or even micro-code to enhance performance and/or memory usage.

The present invention is described hereinafter with reference to flowchart and/or block diagram illustrations of methods, systems, and computer program products according to an embodiment of the invention. It will be understood that each block of the flowchart and/or block diagram illustrations, and combinations of blocks in the flowchart and/or block diagram illustrations, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-usable or computer-readable memory that can direct a computer or other programmable data processing apparatus to function in a particular manner, such that the instructions stored in the computer-usable or computer-readable memory produce an article of manufacture including instruction means that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 5:
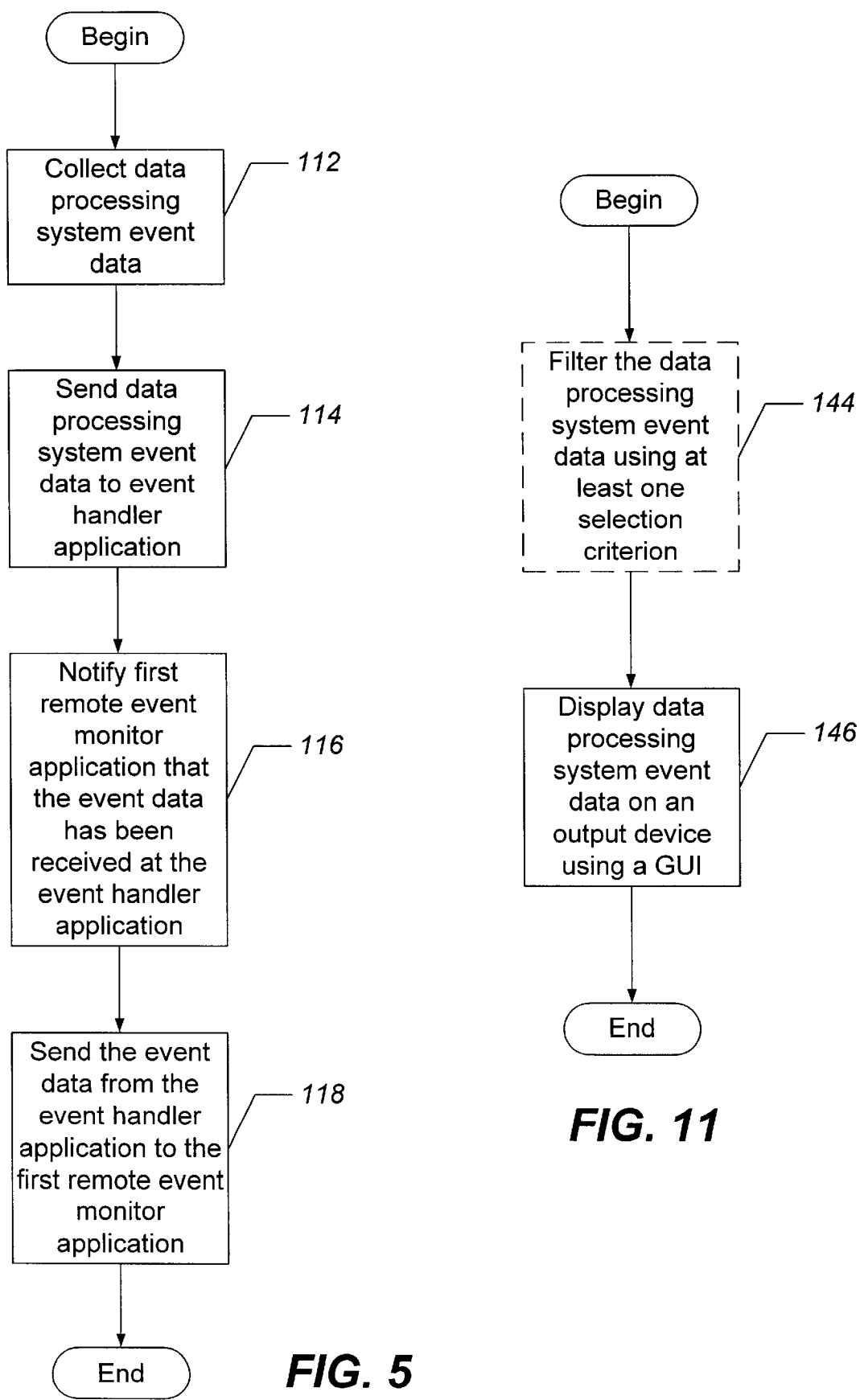
FIGS. 5–8 are flow charts that illustrate exemplary operations of methods, systems, and computer program products for event monitoring in accordance with embodiments of the present invention.

With reference to FIG. 5 and the architectural diagrams of FIGS. 1, 3, and 4, exemplary operations of methods, systems, and computer program products for event monitoring, in accordance with embodiments of the present invention, will be described hereafter. Operations begin at block 112 where the event data collection program module 78 collects the retail POS data processing system 22 event data that are destined to be logged in the retail POS data processing system's 22 event log. At block 114, the event data collection program module 78 sends the retail POS data processing system 22 event data to the event handler program module 82. The data may be sent from the event data collection program module 78 to the event handler program module 82 over a socket interface.

Once the retail POS data processing system 22 event data has been received by the event handler program module 82, an event monitor program module 102 executing on a first remote data processing system (e.g., remote data processing system 32) in a different address space than the event handler program module 82 may be notified at block 116. As discussed hereinabove, the event handler program module 82 and the event monitor program module 102 may implement the JAVA Observable class and Observer interface, respectively. This, in conjunction with the distributed object APIs 84 and 104, may allow the event monitor program module 102 to be notified in real-time when new retail POS data processing system 22 event data has been received by the event handler program module 82. In effect, the present invention may allow event data to be "pushed" out from a local data processing system to the remote data processing system(s) that are observing the local data processing system. As a result, a remote data processing system need not query the local data processing system to determine whether new event data has been received.

The event monitor program module 102 may register or subscribe with the event handler program module 82 as an Observer dynamically. For example, event monitoring may be dynamically stopped and started based on the time of day. Furthermore, event monitoring may be dynamically started and stopped based on such factors as work load balancing between monitoring locations, expertise at specific monitoring locations, skill level at specific monitoring locations, etc.

Figure 6:
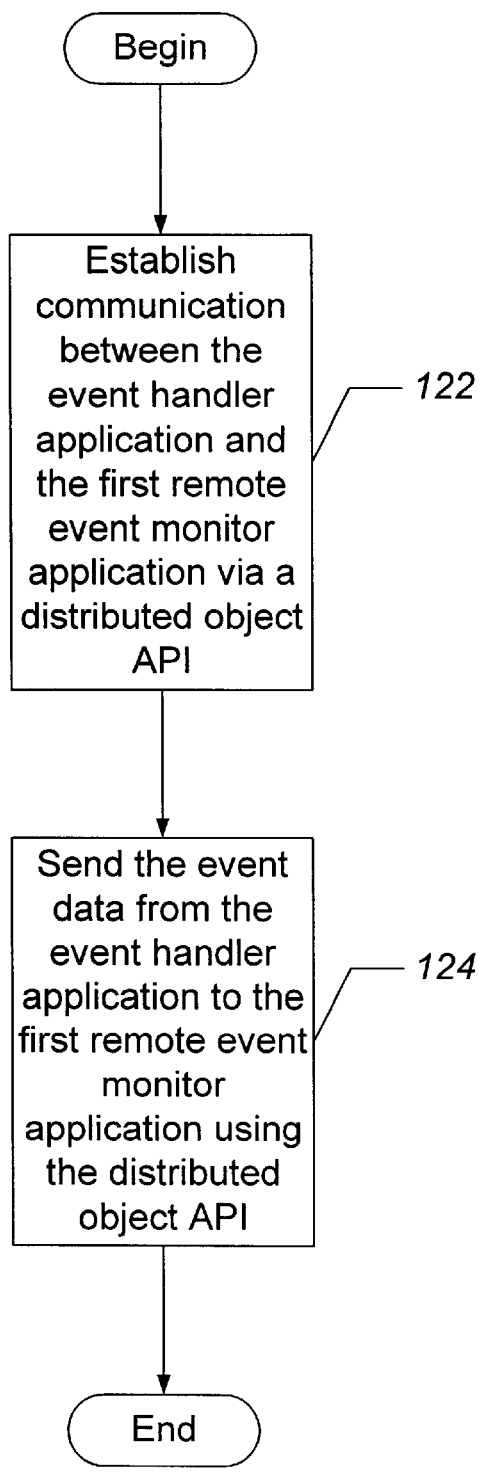

Next, at block 118, the event handler program module 82 sends the retail POS data processing system 22 event data to the event monitor program module 102 executing on a first remote data processing system. In accordance with particular embodiments illustrated in FIG. 6, the event data may be sent from the event handler program module 82 to the event monitor program module 102 by first establishing communication between the event handler program module 82 and the event monitor program module 102 via a distributed object API (i.e., distributed object APIs 84 and 104) at block 122. The retail POS data processing system 22 event data may then be sent from the event handler program module 82 to the event monitor program module 102 using the distributed object API at block 124. For example, as discussed hereinabove, the distributed object API may allow the event handler program module 82 and the event monitor program module 102 to make remote method calls to one another as if they resided in the same address space to send the event data from the event handler program module 82 to the event monitor program module 102.

Figure 7:
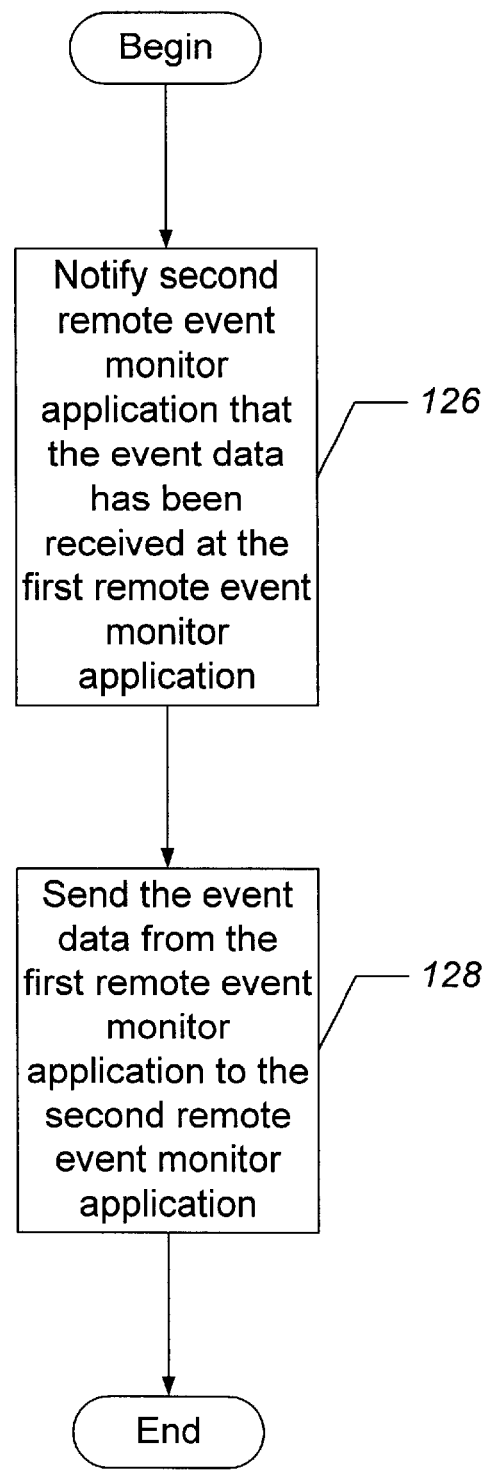

Operations of methods, systems, and computer program products for event monitoring, in accordance with further embodiments of the present invention, will be described hereafter with reference to FIG. 7. Once the event monitor program module 102 receives the retail POS data processing system 22 event data at the first remote data processing system (e.g., remote data processing system 32), a second remote data processing system (e.g., remote data processing system 36) may monitor the first remote data processing system and may wish to receive all or a portion of the event data. As discussed hereinabove, the event monitor program module 102, in addition to implementing the JAVA Observer interface, may also implement the JAVA Observable class to allow event monitor program modules executing on other remote data processing systems to be notified in real-time when new retail POS data processing system 22 event data has been received. Thus, at block 126, an event monitor program module 102 executing on a second remote data processing system (e.g., remote data processing system 36) in a different address space than the event monitor program module 102 executing on the first remote data processing system (e.g., remote data processing system 32) may be notified that new retail POS data processing system 22 event data has been received.

Figure 8:
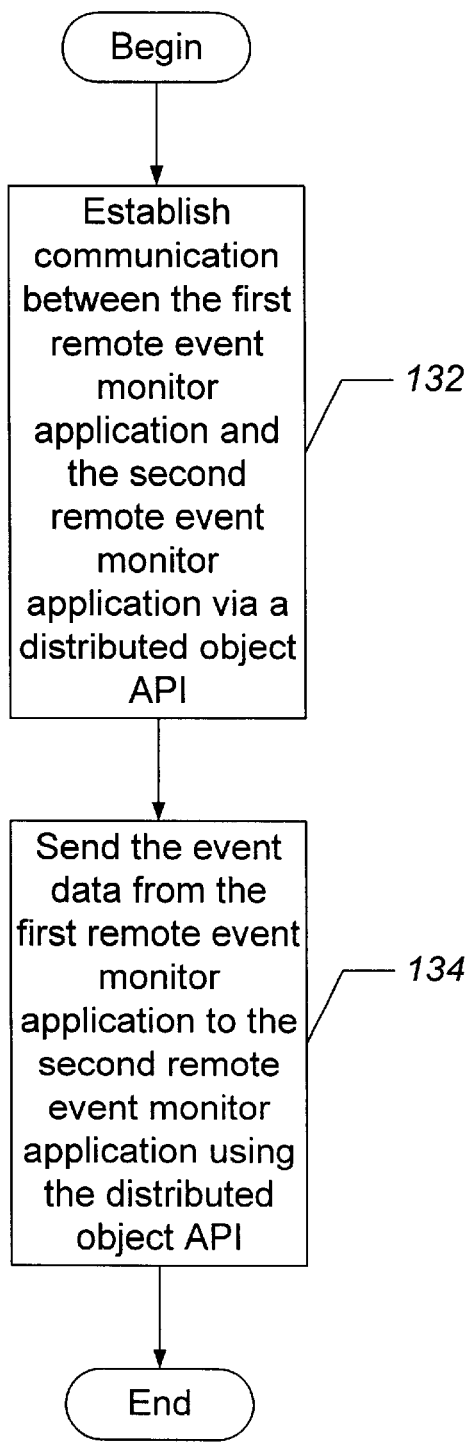

Next, at block 128, the event monitor program module 102 executing on the first remote data processing system sends the retail POS data processing system 22 event data to the event monitor program module 102 executing on the second remote data processing system. In accordance with particular embodiments illustrated in FIG. 8, the event data may be sent from one event monitor program module 102 to another event monitor program module 102 residing in different address spaces (e.g., different remote data processing systems) by first establishing communication between the two event monitor program modules via a distributed object API at block 132. The retail POS data processing system 22 event data may then be sent from the event monitor program module 102 executing on the first remote data processing system to the event monitor program module 102 executing on the second remote data processing system using the distributed object API at block 134.

Figure 9:
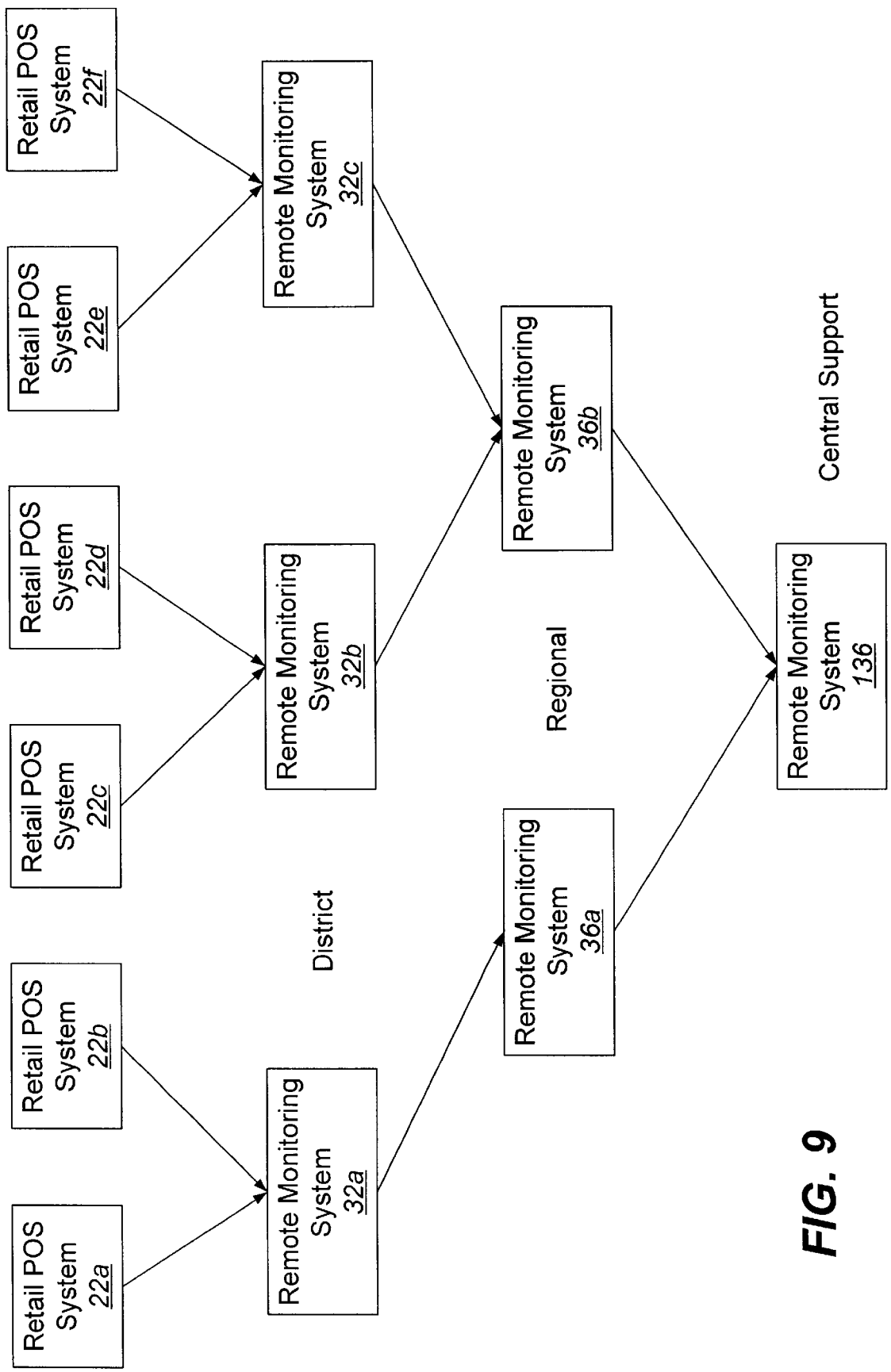
FIG. 9 is a block diagram that illustrates an exemplary hierarchical event monitoring network in accordance with embodiments of the present invention.

In this manner, a hierarchical monitoring system may be constructed in which one event monitor program module may send event data to another event monitor program module. Referring now to FIG. 9, an exemplary hierarchical monitoring system is illustrated in which remote monitoring systems 32a, 32b, and 32c represent district offices for a business. The remote monitoring systems 32a, 32b, and 32c are responsible for monitoring event data that is generated at specific stores, which are represented by retail POS data processing systems 22a, 22b, 22c, 22d, 22e, and 22f. Likewise, the hierarchical monitoring system includes regional offices, which are represented by remote monitoring systems 36a and 36b. The regional offices are responsible for monitoring event data received at one or more district offices. Finally, a central support or headquarters office is represented by remote monitoring system 136, which is responsible for monitoring all of the regional offices.

Note that although the remote monitoring systems 32a,b,c and 36a,b are illustrated as being connected to one another and the retail POS data processing systems 22a,b,c,d,e,f using wireline connections, it is envisioned that the remote monitoring systems 32a,b,c and 36a,b may be implemented by data processing systems, such as a Personal Digital Assistant (PDA), cellular phone, Internet Appliance, or other pervasive computing device. These mobile data processing systems may monitor event data generated at one or more stores or received at one or more offices via a wireless network. This may allow mobile store employees to be notified of events that may require their attention.

Figure 10:
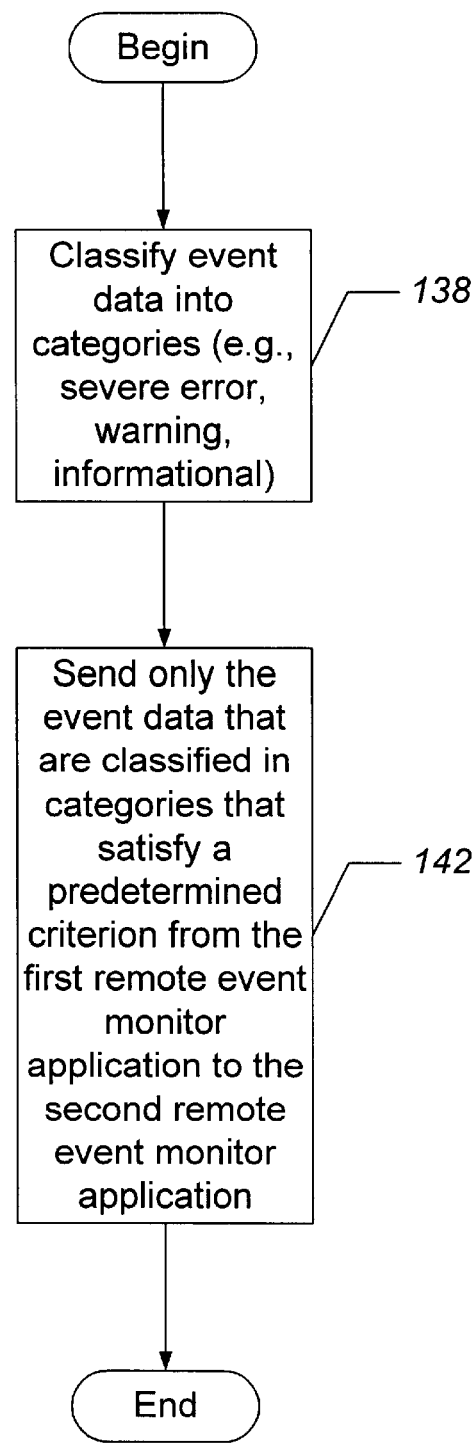

Many businesses, however, may not wish to monitor or review all of the event data generated by data processing systems at the lowest level in the hierarchy (e.g., retail POS data processing systems 22a,b,c,d,e,f) at higher levels in the hierarchy (e.g., remote monitoring systems 36a,b and 136). Accordingly, in further embodiments of the present invention illustrated in FIG. 10, the retail POS data processing system 22 event data may be classified into categories, such as severe error events, warning events, and informational events at block 138. Next, at block 142, only those data that satisfy a predetermined criterion (e.g., only severe error events and warning events) may be sent when sending event data from one event monitor program module executing on a first remote data processing system to another event monitor program module executing on a second remote data processing system. By selecting only certain categories of event data to be forwarded in a hierarchical monitoring system, those remote monitoring systems at the top of the hierarchy (e.g., remote monitoring system 136 of FIG. 9) may be better able to direct their attention to the most important events occurring in the data processing systems (e.g., the stores) for which they have supervisory authority.

Figure 12:
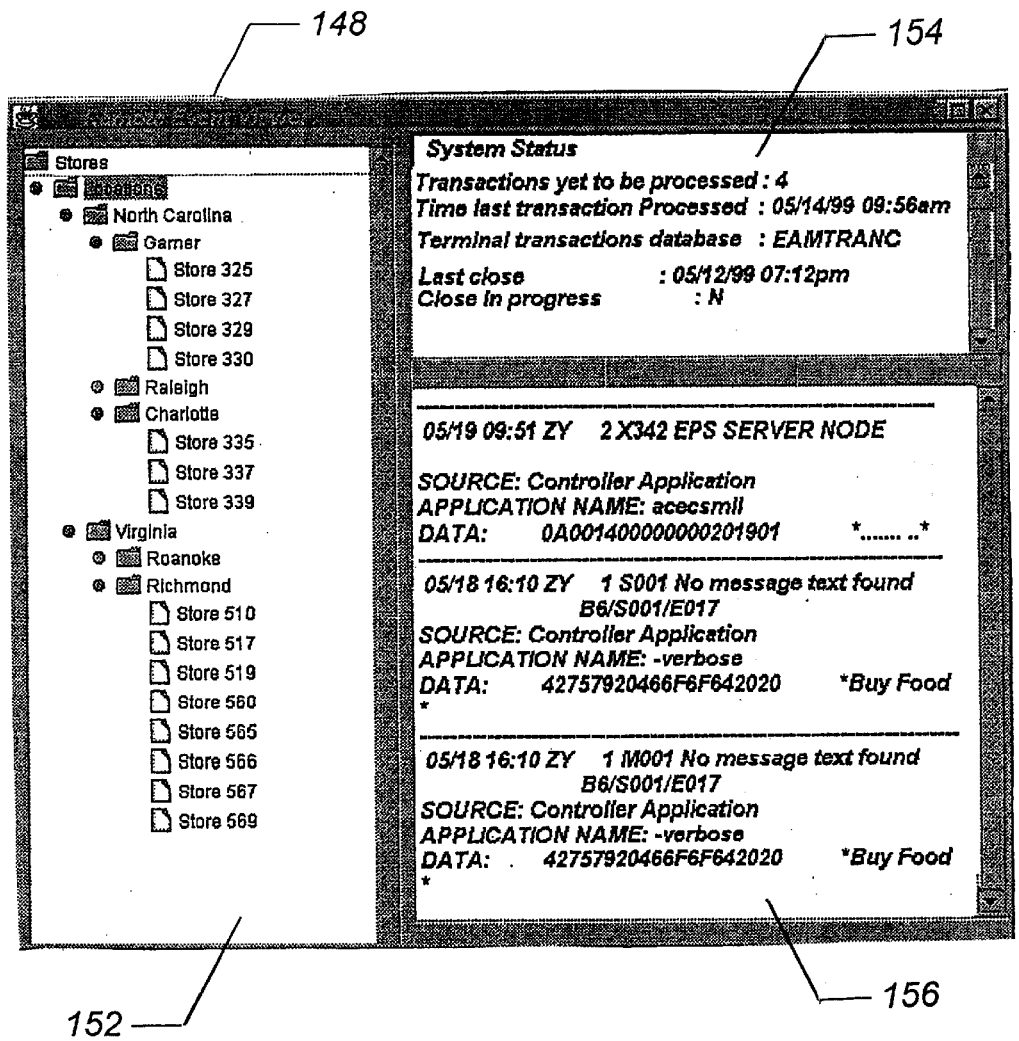
FIG. 12 is a view of a graphical user interface (GUI) for displaying data processing system event data in accordance with embodiments of the present invention.

Referring now to FIG. 11, operations of methods, systems, and computer program products for event monitoring, in accordance with further embodiments of the present invention, will be described hereafter. As discussed hereinabove, the event monitor program module 102 may include software for filtering the retail POS data processing system 22 event data and a graphical user interface (GUI) for displaying the retail POS data processing system 22 event data on a display device. Thus, at block 144, the event monitor program module 102 may optionally filter the retail POS data processing system 22 event data using one or more selection criterion. Selection criterion that may be used include, but are not limited to, the following criterion: date range, data processing system identification, POS terminal number, event severity, informational message group, informational message number, event source number, and event count number. Once the retail POS data processing system 22 event data has been optionally filtered, the event data may be displayed on an output device (e.g., a monitor) using a GUI, such as a Web browser at block 146. FIG. 12 illustrates a view of event data displayed using an exemplary GUI 148. Specifically, the GUI 148 includes a first window pane 152 that illustrates the relationship between individual stores (e.g., Store 325, 335, 510, etc.), district office support (e.g., Garner, Charlotte, Richmond, etc.), regional office support (e.g., North Carolina and Virginia), and central or headquarters support (e.g., Stores/Locations). The GUI 148 further includes a second window pane 154 that displays the data processing system status of a selected store. And finally, the GUI 148 includes a third window pane 156 that displays the retail POS data processing system event data obtained from the selected store.

The flow charts of FIGS. 5–8 and 10–11 illustrate the architecture, functionality, and operations of the software and data used for data processing system event monitoring in accordance with the present invention. In this regard, each block represents a module, segment, object, or portion of code, which comprises one or more executable instructions for implementing the specified logical function(s). It should also be noted that in some alternative implementations, the functions noted in the blocks may occur out of the order noted in FIGS. 5–8 and 10–11. For example, two blocks shown in succession may in fact be executed substantially concurrently or the blocks may sometimes be executed in the reverse order, depending upon the functionality involved.

From the foregoing it can readily be seen that, in accordance with the present invention, a company or business that includes multiple stores and/or managing offices may use the present invention to facilitate remote monitoring of data processing system events at their stores and offices. The present invention is scalable, which may allow offices in the business hierarchy to remotely monitor event data received at offices and/or stores for which they have management responsibility. The present invention may be implemented using standardized communication protocols, such as sockets and/or distributed object APIs, to allow for easy integration with data processing systems that already support these protocols.

In concluding the detailed description, it should be noted that many variations and modifications can be made to the preferred embodiments without substantially departing from the principles of the present invention. All such variations and modifications are intended to be included herein within the scope of the present invention, as set forth in the following claims.

I claim:

1. A method of monitoring events in a data processing system, comprising:
    collecting data processing system event data;
    sending the data processing system event data to an event handler program module;
    notifying a first remote program module when the event handler program module receives the data processing system event data, the first remote program module residing in a different address space than the event handler program module; and
    sending the data processing system event data from the event handler program module to the first remote program module, comprising:
        establishing communication between the event handler program module and the first remote program module via a distributed object Application Programming Interface (API); and
        sending the data processing system event data from the event handler program module to the first remote program module using the distributed object API.

2. A method as recited in claim 1, wherein sending the data processing event data to the event handler program module comprises:
    sending the data processing event data to the event handler program module over a socket interface.

3. A method as recited in claim 1, wherein the distributed object API is selected from the group consisting of a JAVA Remote Method Invocation (RMI) API, a Common Object Request Broker Architecture (CORBA) API, and a Distributed Component Object Model (DCOM) API.

4. A method as recited in claim 1, further comprising:
    notifying a second remote program module when the first remote program module receives the data processing system event data, the second remote program module residing in a different address space than the first remote program module; and
    sending the data processing system event data from the first remote program module to the second remote program module.

5. A method as recited in claim 4, wherein sending the data processing system event data from the first remote program module to the second remote program module comprises:
    establishing communication between the first remote program module and the second remote program module via a distributed object Application Programming Interface (API); and
    sending the data processing system event data from the first remote program module to the second remote program module using the distributed object API.

6. A method as recited in claim 5, wherein the distributed object API is selected from the group consisting of a JAVA Remote Method Invocation (RMI) API, a Common Object Request Broker Architecture (CORBA) API, and a Distributed Component Object Model (DCOM) API.

7. A method as recited in claim 4, further comprising:
    classifying the data processing system event data into a plurality of categories.

8. A method as recited in claim 7, wherein sending the data processing system event data from the first remote program module to the second remote program module comprises:
    sending from the first remote program module to the second remote program module only the data processing system event data that are classified in categories of the plurality of categories that satisfy a predetermined criterion.

9. A method as recited in claim 1, further comprising:
    displaying the data processing system event data on an output device using a graphical user interface (GUI) after sending the data processing system event data from the event handler program module to the first remote program module.

10. A method as recited in claim 9, further comprising:
    filtering the data processing system event data using at least one selection criterion before displaying the data processing system event data on the output device using the graphical user interface.

11. A method as recited in claim 1, wherein the data processing system comprises a point of sale (POS) system.

12. An event monitoring system, comprising:
    a local data processing system;
    a first remote data processing system;
    a first event monitor program that executes on the first remote data processing system;
    an event data collection program that executes on the local data processing system and is configured to collect event data for the local data processing system;
    an event handler program that executes on the local data processing system and is configured to receive the event data sent from the event data collection program, to notify the first event monitor program when the event data is received, and to send the event data to the first event monitor program, the first event monitor program and the event handler program being configured to communicate via a distributed object Application Programming Interface (API).

13. An event monitoring system as recited in claim 12, wherein the distributed object API is selected from the group consisting of a JAVA Remote Method Invocation (RMI) API, a Common Object Request Broker Architecture (CORBA) API, and a Distributed Component Object Model (DCOM) API.

14. An event monitoring system as recited in claim 12, further comprising:
   a second remote data processing system; and
   a second event monitor program that executes on the second remote data processing system, the first event monitor program being configured to notify the second event monitor program when the event data is received, and to send the event data to the first event monitor program.

15. An event monitoring system as recited in claim 14, wherein the first event monitor program and the second event monitor program are configured to communicate via a distributed object Application Programming Interface (API).

16. An event monitoring system as recited in claim 15, wherein the distributed object API is selected from the group consisting of a JAVA Remote Method Invocation (RMI) API, a Common Object Request Broker Architecture (CORBA) API, and a Distributed Component Object Model (DCOM) API.

17. An event monitoring system, comprising:
   means for collecting data processing system event data;
   means for sending the data processing system event data to an event handler program module;
   means for notifying a first remote program module when the event handler program module receives the data processing system event data, the first remote program module residing in a different address space than the event handler program module; and
   means for sending the data processing system event data from the event handler program module to the first remote program module, comprising:
      means for establishing communication between the event handler program module and the first remote program module via a distributed object Application Programming Interface (API); and
      means for sending the data processing system event data from the event handler program module to the first remote program module using the distributed object API.

18. A system as recited in claim 17, wherein the means for sending the data processing event data to the event handler program module comprises:
   means for sending the data processing event data to the event handler program module over a socket interface.

19. A system as recited in claim 17, wherein the distributed object API is selected from the group consisting of a JAVA Remote Method Invocation (RMI) API, a Common Object Request Broker Architecture (CORBA) API, and a Distributed Component Object Model (DCOM) API.

20. A system as recited in claim 17, further comprising:
   means for notifying a second remote program module when the first remote program module receives the data processing system event data, the second remote program module residing in a different address space than the first remote program module; and
   means for sending the data processing system event data from the first remote program module to the second remote program module.

21. A system as recited in claim 20, wherein the means for sending the data processing system event data from the first remote program module to the second remote program module comprises:
   means for establishing communication between the first remote program module and the second remote program module via a distributed object Application Programming Interface (API); and
   means for sending the data processing system event data from the first remote program module to the second remote program module using the distributed object API.

22. A system as recited in claim 21, wherein the distributed object API is selected from the group consisting of a JAVA Remote Method Invocation (RMI) API, a Common Object Request Broker Architecture (CORBA) API, and a Distributed Component Object Model (DCOM) API.

23. A system as recited in claim 22, further comprising:
   means for classifying the data processing system event data into a plurality of categories.

24. A system as recited in claim 23, wherein the means for sending the data processing system event data from the first remote program module to the second remote program module comprises:
   means for sending from the first remote program module to the second remote program module only the data processing system event data that are classified in categories of the plurality of categories that satisfy a predetermined criterion.

25. A system as recited in claim 17, further comprising:
   means for displaying the data processing system event data on an output device using a graphical user interface (GUI) responsive to the means for sending the data processing system event data from the event handler program module to the first remote program module.

26. A system as recited in claim 25, further comprising:
   means for filtering the data processing system event data using at least one selection criterion, the means for displaying the data processing system event data on the output device using the graphical user interface being responsive to the means for filtering the data processing system event data using the at least one selection criterion.

27. A system as recited in claim 17, wherein the data processing system comprises a point of sale (POS) system.

28. A computer program product for monitoring events in a data processing system, comprising:
   computer readable program code for collecting data processing system event data;
   computer readable program code for sending the data processing system event data to an event handler program module;
   computer readable program code for notifying a first remote program module when the event handler program module receives the data processing system event data, the first remote program module residing in a different address space than the event handler program module; and
   computer readable program code for sending the data processing system event data from the event handler program module to the first remote program module, comprising:
      computer readable program code for establishing communication between the event handler program module and the first remote program module via a distributed object Application Programming Interface (API); and computer readable program code for sending the data processing system event data from the event handler program module to the first remote program module using the distributed object API.

29. A computer program product as recited in claim 28, wherein the computer readable program code for sending the data processing event data to the event handler program module comprises:

computer readable program code for sending the data processing event data to the event handler program module over a socket interface.

30. A computer program product as recited in claim 28, wherein the distributed object API is selected from the group consisting of a JAVA Remote Method Invocation (RMI) API, a Common Object Request Broker Architecture (CORBA) API, and a Distributed Component Object Model (DCOM) API.

31. A computer program product as recited in claim 28, further comprising:

computer readable program code for notifying a second remote program module when the first remote program module receives the data processing system event data, the second remote program module residing in a different address space than the first remote program module; and computer readable program code for sending the data processing system event data from the first remote program module to the second remote program module.

32. A computer program product as recited in claim 31, wherein the computer readable program code for sending the data processing system event data from the first remote program module to the second remote program module comprises:

computer readable program code for establishing communication between the first remote program module and the second remote program module via a distributed object Application Programming Interface (API); and computer readable program code for sending the data processing system event data from the first remote program module to the second remote program module using the distributed object API.

33. A computer program product as recited in claim 32, wherein the distributed object API is selected from the group consisting of a JAVA Remote Method Invocation (RMI) API, a Common Object Request Broker Architecture (CORBA) API, and a Distributed Component Object Model (DCOM) API.

34. A computer program product as recited in claim 31, further comprising:

computer readable program code for classifying the data processing system event data into a plurality of categories.

35. A computer program product as recited in claim 34, wherein the computer readable program code for sending the data processing system event data from the first remote program module to the second remote program module comprises:

computer readable program code for sending from the first remote program module to the second remote program module only the data processing system event data that are classified in categories of the plurality of categories that satisfy a predetermined criterion.

36. A computer program product as recited in claim 28, further comprising:

computer readable program code for displaying the data processing system event data on an output device using a graphical user interface (GUI) responsive to the computer readable program code for sending the data processing system event data from the event handler program module to the first remote program module.

37. A computer program product as recited in claim 36, further comprising:

computer readable program code for filtering the data processing system event data using at least one selection criterion, the computer readable program code for displaying the data processing system event data on the output device using the graphical user interface being responsive to the computer readable program code for filtering the data processing system event data using the at least one selection criterion.

38. A computer program product as recited in claim 37, wherein the data processing system comprises a point of sale (POS) system.

* * * * *